(12) United States Patent
Koh

(10) Patent No.: US 11,518,492 B2
(45) Date of Patent: Dec. 6, 2022

(54) AIRCRAFT FLOORING ARCHITECTURE

(71) Applicant: Techno-Coatings, Inc., North Miami, FL (US)

(72) Inventor: Tuan Huat Jerry Koh, North Miami, FL (US)

(73) Assignee: Techno-Coatings, Inc., North Miami, FL (US)

(*) Notice: Subject to any disclaimer, the term of this patent is extended or adjusted under 35 U.S.C. 154(b) by 172 days.

(21) Appl. No.: 16/775,039

(22) Filed: Jan. 28, 2020

(65) Prior Publication Data

US 2020/0307759 A1    Oct. 1, 2020

Related U.S. Application Data

(60) Provisional application No. 62/797,838, filed on Jan. 28, 2019.

(51) Int. Cl.
*B64C 1/18* (2006.01)
*B32B 3/06* (2006.01)
(Continued)

(52) U.S. Cl.
CPC .................. *B64C 1/18* (2013.01); *B32B 3/06* (2013.01); *B32B 3/12* (2013.01); *B32B 5/024* (2013.01); *B32B 5/18* (2013.01); *B32B 5/245* (2013.01); *B32B 21/047* (2013.01); *B32B 21/08* (2013.01); *B32B 27/06* (2013.01); *B32B 27/12* (2013.01); *B32B 27/304* (2013.01); *B32B 27/34* (2013.01); *E04B 5/02* (2013.01); *B32B 2250/40* (2013.01);
(Continued)

(58) Field of Classification Search
CPC ......... B64C 1/18; B32B 3/06; B32B 2471/00; B32B 2605/18; E04B 5/02
See application file for complete search history.

(56) References Cited

U.S. PATENT DOCUMENTS 3,353,314 A    11/1967   Melcher
5,046,690 A     9/1991   Nordstrom
(Continued)

FOREIGN PATENT DOCUMENTS

CA      2079607 A1    10/1991
CA      3004249 A1     1/2019
(Continued)

OTHER PUBLICATIONS

May 22, 2020—(PCT) WO and ISR—App. No. PCT/US20/15479.
(Continued)

*Primary Examiner* — Jasper Saberi
(74) *Attorney, Agent, or Firm* — Banner & Witcoff, Ltd.

(57) ABSTRACT

A flooring system for enclosures or vehicles, such as an aircraft flooring architecture, includes a flooring panel with at least an upper layer, a core ply, and a bottom layer. The bottom layer of the flooring panel has a top face and a bottom face, an upper layer of the flooring panel has an upper face and a lower face, and a core ply of the flooring panel has an upper surface bonded to the lower face of the upper layer and a bottom surface bonded to the top face of the bottom layer. The bottom face of the bottom layer is located on a structural floor of an enclosure or vehicle, such as the aircraft, and the bottom layer of the flooring panel slides over the structural floor.

20 Claims, 6 Drawing Sheets

(51) Int. Cl.
  *B32B 3/12* (2006.01)
  *B32B 5/02* (2006.01)
  *B32B 5/18* (2006.01)
  *B32B 5/24* (2006.01)
  *B32B 21/04* (2006.01)
  *B32B 21/08* (2006.01)
  *B32B 27/06* (2006.01)
  *B32B 27/12* (2006.01)
  *B32B 27/30* (2006.01)
  *B32B 27/34* (2006.01)
  *E04B 5/02* (2006.01)

(52) U.S. Cl.
  CPC ... *B32B 2260/021* (2013.01); *B32B 2260/046* (2013.01); *B32B 2262/101* (2013.01); *B32B 2266/0264* (2013.01); *B32B 2274/00* (2013.01); *B32B 2305/022* (2013.01); *B32B 2305/024* (2013.01); *B32B 2471/00* (2013.01); *B32B 2605/18* (2013.01)

(56) References Cited

U.S. PATENT DOCUMENTS

| | | |
|---|---|---|
| 5,167,087 A | 12/1992 | Plumly |
| 5,205,091 A | 4/1993 | Brown |
| 5,363,579 A | 11/1994 | Plumly |
| 5,524,373 A | 6/1996 | Plumly |
| 5,806,270 A | 9/1998 | Solano et al. |
| 7,121,052 B2 | 10/2006 | Niese et al. |
| 7,677,005 B2 | 3/2010 | Pervan |
| 7,967,251 B2 | 6/2011 | Wood |
| 7,988,809 B2 | 8/2011 | Smith et al. |
| 10,836,463 B2 | 11/2020 | Mills et al. |
| 10,927,551 B2 | 2/2021 | Klein |
| 10,982,439 B2 | 4/2021 | Childress |
| 2002/0046527 A1 | 4/2002 | Nelson |
| 2002/0095897 A1 | 7/2002 | Summerford |
| 2003/0211291 A1 | 11/2003 | Castiglione et al. |
| 2006/0214058 A1* | 9/2006 | Westre ............... B61D 17/10 244/119 |
| 2007/0283654 A1 | 12/2007 | Stanchfield et al. |
| 2008/0005993 A1 | 1/2008 | Su |
| 2008/0014399 A1 | 1/2008 | Martin et al. |
| 2009/0038254 A1 | 2/2009 | Steele et al. |
| 2009/0151291 A1 | 6/2009 | Pervan |
| 2011/0131901 A1 | 6/2011 | Pervan et al. |
| 2013/0092793 A1 | 4/2013 | Braeutigam |
| 2014/0033635 A1 | 2/2014 | Pervan et al. |
| 2014/0157700 A1 | 6/2014 | Martensson |
| 2015/0061380 A1 | 3/2015 | Schomacker |
| 2016/0060880 A1 | 3/2016 | Stover et al. |
| 2017/0254096 A1 | 9/2017 | Pervan |
| 2017/0297301 A1* | 10/2017 | Mills ..................... B32B 5/26 |
| 2017/0297713 A1 | 10/2017 | Hegenbart et al. |
| 2018/0038114 A1 | 2/2018 | Palsson |
| 2018/0194451 A1 | 7/2018 | Cosby et al. |
| 2018/0327074 A1 | 11/2018 | Mills et al. |
| 2018/0355620 A1 | 12/2018 | Pervan |
| 2019/0009882 A1* | 1/2019 | Mills ............... B64D 11/0696 |
| 2019/0055440 A1 | 2/2019 | Roosen |
| 2019/0177983 A1 | 6/2019 | Klein |
| 2019/0276133 A1* | 9/2019 | Hesslewood ............ B64C 1/18 |
| 2019/0277041 A1 | 9/2019 | Pervan et al. |
| 2019/0383026 A1 | 12/2019 | Bergelin et al. |
| 2020/0001967 A1 | 1/2020 | Pirner |
| 2020/0018065 A1 | 1/2020 | Childress |
| 2020/0102063 A1 | 4/2020 | Koh |
| 2020/0239123 A1 | 7/2020 | Stegmiller et al. |
| 2020/0240151 A1 | 7/2020 | Koh |
| 2020/0331582 A1 | 10/2020 | Hesslewood |
| 2021/0148120 A1 | 5/2021 | Britton et al. |

FOREIGN PATENT DOCUMENTS

| | | |
|---|---|---|
| DE | 29609590 U1 | 7/1996 |
| EP | 3424812 A1 | 1/2019 |
| JP | H10183965 A | 7/1998 |
| WO | 2000020705 A1 | 4/2000 |
| WO | 2014195548 A1 | 12/2014 |
| WO | 2017197503 A1 | 11/2017 |

OTHER PUBLICATIONS

Apr. 21, 2020—(PCT) WO and ISR—App. No. PCT/US20/15475.
Apr. 27, 2020—(PCT) WO and ISR—App. No. PCT/US20/15473.
Jan. 22, 2020—(PCT) WO and ISR—App. No. PCT/US19/854106.

* cited by examiner

AIRCRAFT FLOORING ARCHITECTURE

CROSS REFERENCE TO RELATED APPLICATION(S)

This application claims priority to U.S. Provisional Patent Application No. 62/797,838 filed Jan. 28, 2019, and entitled "Aircraft Flooring Architecture," which is incorporated herein by reference in its entirety.

FIELD OF THE INVENTION

The present disclosure is related to aircraft flooring architecture that includes a flooring panel with at least an upper layer, a core ply and a bottom layer.

BACKGROUND OF THE INVENTION

Aircraft flooring architecture refers to elements and/or devices used to configure a flooring panel to produce the appearance and behavior of a monolithic aircraft flooring section.

BRIEF DESCRIPTION OF THE INVENTION

Aspects of the disclosure provide effective, efficient, scalable, and convenient technical solutions that address and overcome technical problems associated with aircraft flooring architectures. The present disclosure is related to an aircraft flooring architecture that includes a flooring panel with at least an upper layer, a core ply and a bottom layer. The flooring panel, such as those for use in aircraft flooring applications, comprises a bottom layer having a top face and a bottom face, an upper layer having an upper face and a lower face, and a core ply having an upper surface bonded to the lower face of the upper layer and a bottom surface bonded to the top face of the bottom layer, where the bottom face of the bottom layer is located adjacent to a surface of a structural floor of an aircraft, and wherein the flooring panel is capable of sliding over the structural floor.

BRIEF DESCRIPTION OF THE DRAWINGS

The present disclosure is illustrated by way of example and not limited in the accompanying figures in which like reference numerals indicate similar elements and in which.

DETAILED DESCRIPTION OF THE INVENTION

In the following description of various illustrative examples, reference is made to the accompanying drawings, which form a part hereof, and in which is shown, by way of illustration, various examples in which aspects of the disclosure may be practiced. It is to be understood that other configurations may be utilized, and/or structural and functional modifications may be made, without departing from the scope of the present disclosure.

Flooring panels can be useful in combination with the panels disclosed in U.S. patent application Ser. No. 16/590,038. The application discloses an inventive floating floor attachment system that allows installation of a rigid flooring product with respect to the aircraft structural floor panel via discrete floating attach points. The floating attach points allow for a specific amount of displacement and prevent permanent deformation of the floor panel. This avoids deformations of the flooring panels during the movement of underlying aircraft floor support structures, which may be caused by displacement from internal loads due to fuselage pressurization and flight maneuverers, as well as expansion and contraction due to temperature.

Figure 1:
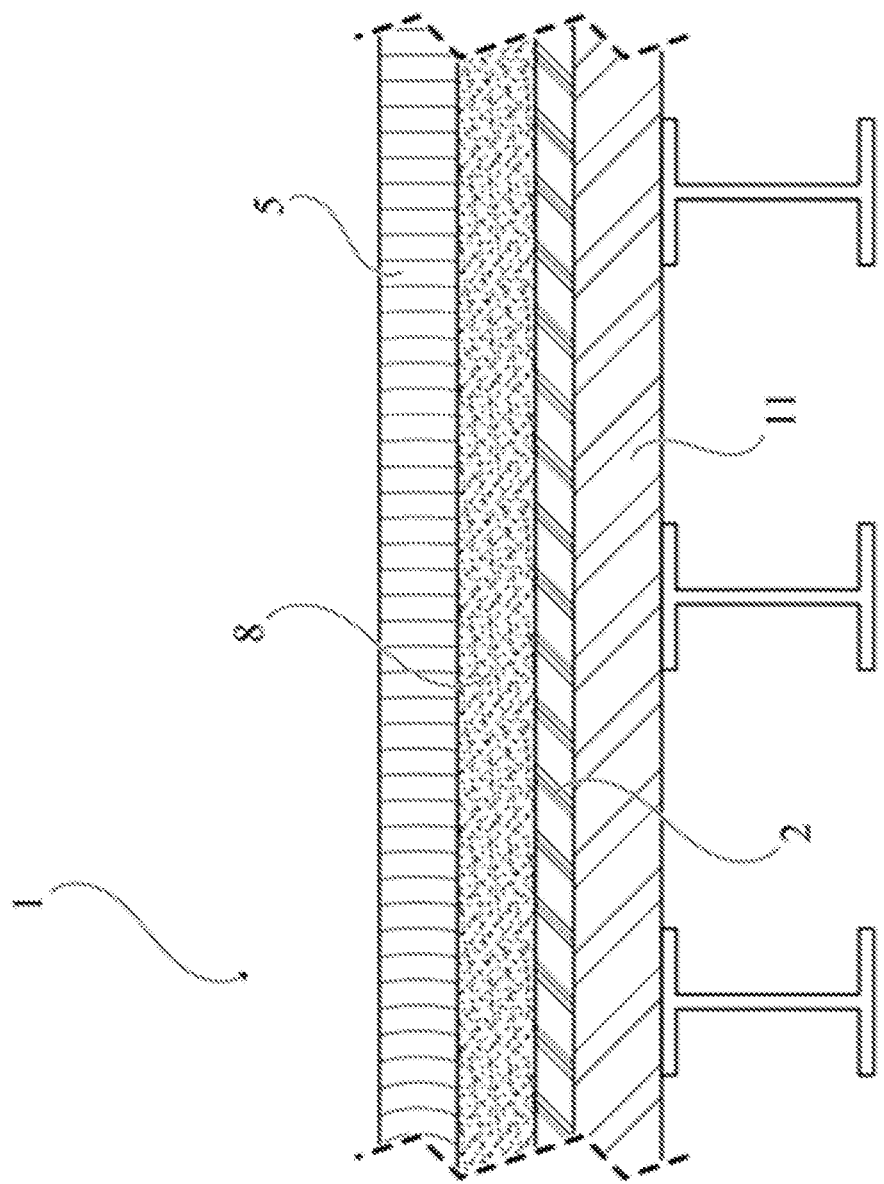
FIG. 1 corresponds to a section view of an embodiment of a flooring panel.
Figure 5:
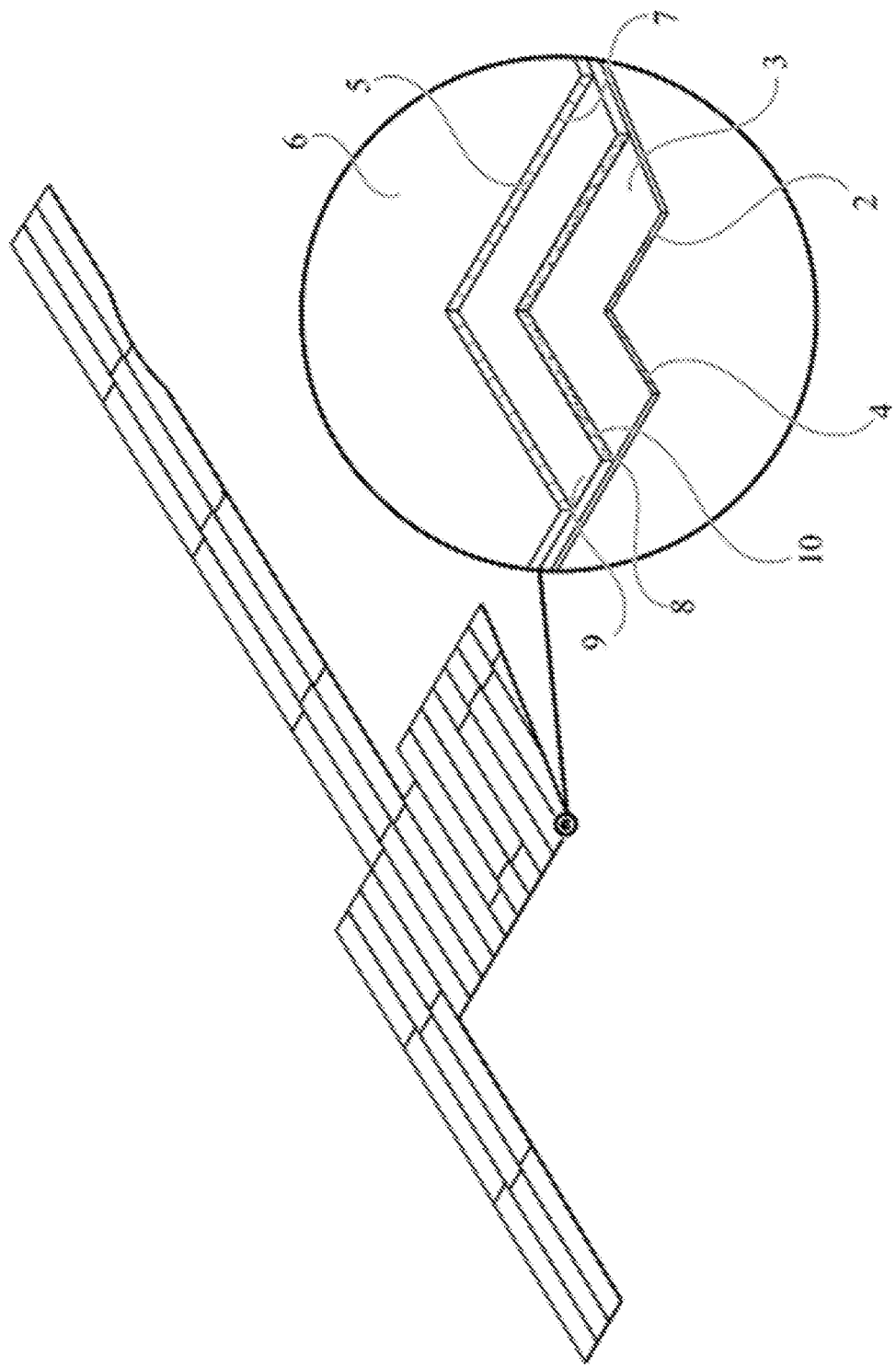
FIG. 5 corresponds to an isometric view of an illustrative example of an aircraft flooring installation and showing details of a flooring panel, according to aspects of this disclosure.

Making reference to FIG. 1 and FIG. 5, the illustrative example corresponds to a flooring panel 1 for aircraft flooring placed atop the structural flooring of the aircraft, comprising:

a bottom layer 2 having a top face 3 and a bottom face 4;
an upper layer 5 having an upper face 6 and a lower face 7; and
a core ply 8 having an upper surface 9 bonded to the lower face 7 of the upper layer 5 and a bottom surface 10 bonded to the top face 3 of the bottom layer 2; where the bottom face 4 of the bottom layer 2 is located on (or adjacent to) a structural floor 11 of an aircraft; and where the flooring panel 1 slides over the structural floor 11.

The configuration of the flooring panels 1 avoids deformations during the movement of underlying aircraft floor support structures, which may be caused by displacement from internal loads due to fuselage pressurization and/or flight maneuverers, as well as due to other forces such as expansion and contraction due to temperature.

Figure 3:
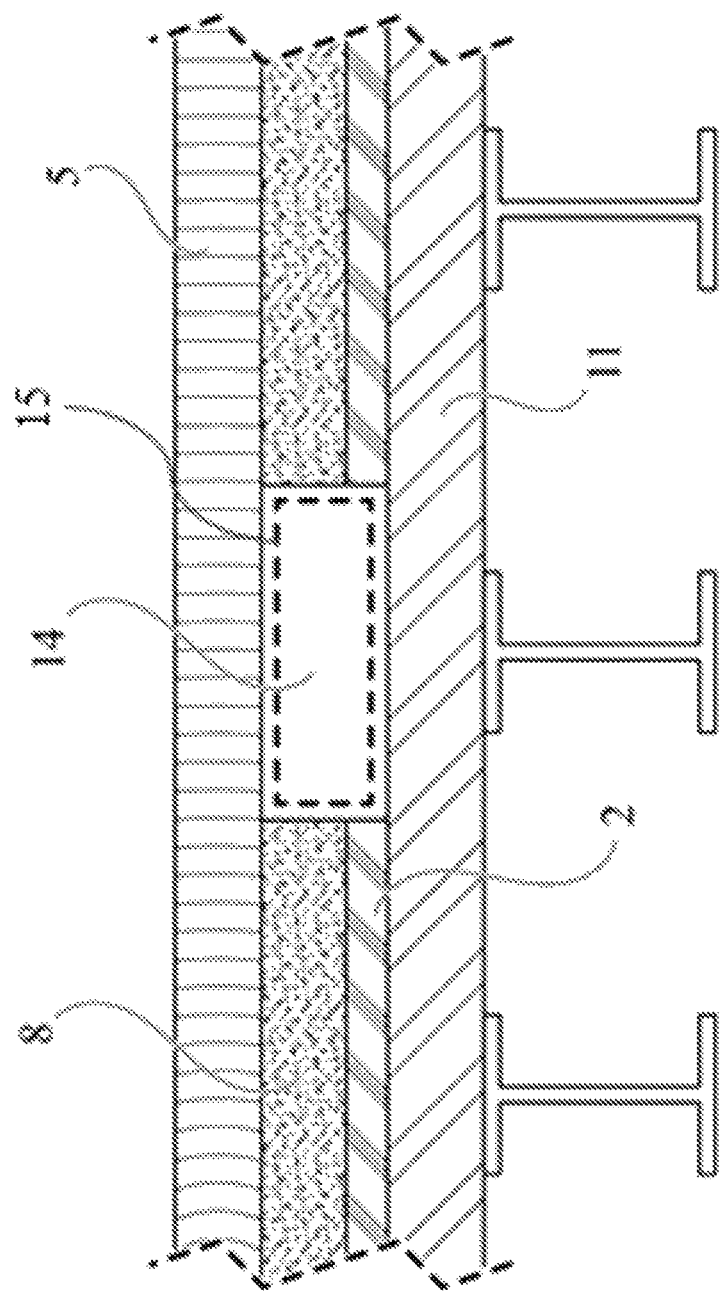
FIG. 3 corresponds to a section view of an illustrative example of a flooring panel attached to the structural floor by a floor puck, according to aspects of this disclosure.

In some cases, making reference to FIGS. 1, 3 and 4, each flooring panel 1 may contain the following three elements: an upper layer 5, a bottom layer 2, a core ply 8 and may include a floor puck 15 as the one described in the U.S. patent application Ser. No. 16/590,038, entitled "Floating Floor Attachment System."

Figure 4B:
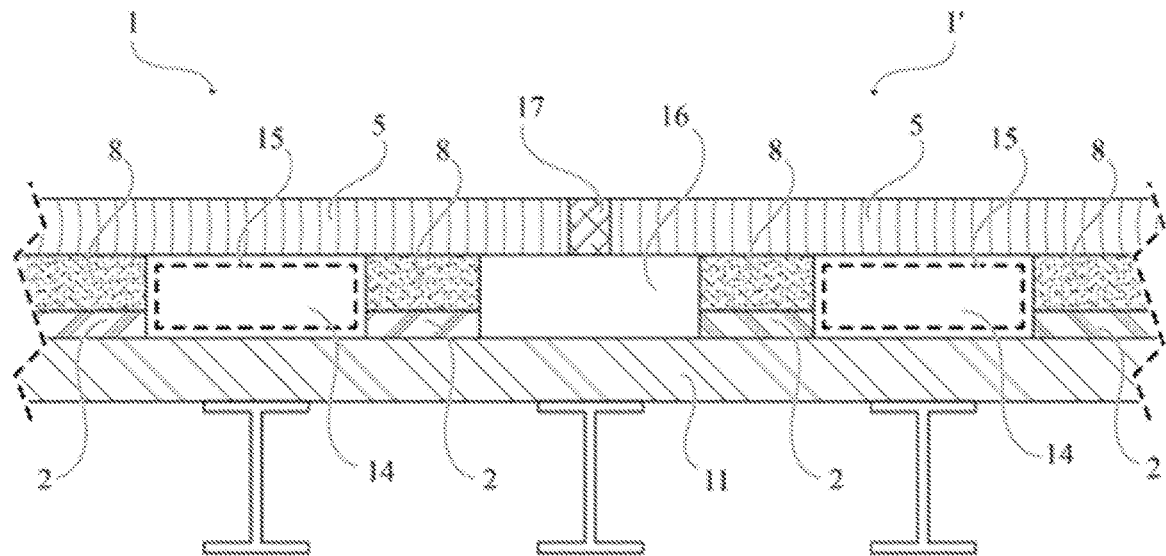
FIGS. 4A and 4B correspond to section views of illustrative examples showing two flooring panels, a spacer panel, and a sealant member, wherein each flooring panel is attached by a floor puck to the structural floor of the aircraft, according to aspects of this disclosure.
Figure 4A:
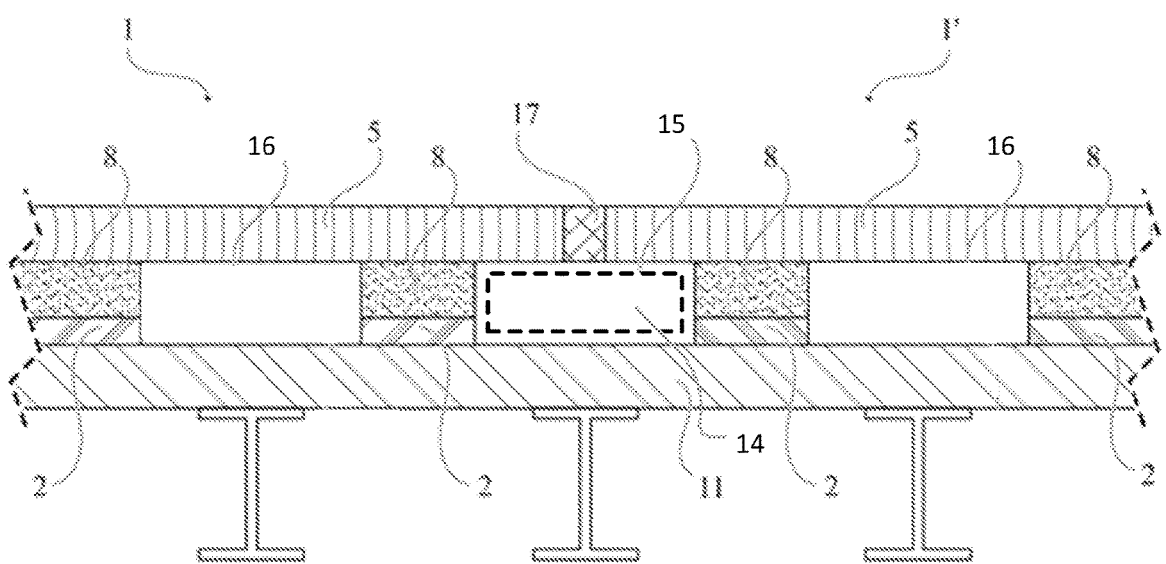

For example, making reference to FIG. 3 and FIGS. 4A and 4B, and referring to U.S. patent application no. U.S. 62/739,818, the flooring panel 1 may have a panel housing 14 that is fixed between the upper layer 5 and the structural floor 11 and may be operatively designed to receive the floor puck 15. The floor puck 15 may be fixed to the aircraft structural floor 11 and may include an upper insertion face operatively designed to fit into the panel housing 14 of the flooring panel 1. In this manner, the upper layer 5 floats on the floor puck 15. Additionally, gaps may be formed between the panel housing 14 and the upper insertion face of the floor puck 15 that may allow a limited horizontal displacement of the flooring panel 1. Furthermore, the panel housing 14 floats on the floor puck 15, where gaps exist between the perimeter of the floor puck 15 and the interior of the panel housing 14 to allow for limited displacement. In this manner, a gap control media is located within these gaps and may allow the panel housing 14 to be centered with the floor puck 15 during non-loading conditions and may additionally provide resistance to displacement during loading conditions.

It would be understood, that loading conditions are forces, deformations, and/or accelerations applied to a structure or its components. Loads cause stresses, deformations, and/or displacements in structures. Excess loading, or overloading, may cause structural failure, so that such a possibility should be considered in the design of any material and/or structure potentially subject to these conditions. Further, non-loading conditions refer to an absence of forces, deformations, and/or accelerations applied to a structure or its components, other than gravity in its resting position.

Particularly, it should be understood that an illustrative loading condition, may be a condition where force is generated due to fuselage pressurization and/or flight maneuverers, expansion and contraction due to temperature, aerodynamic forces, pressure in sealed compartments, dynamic loads such as momentum, vibration, slosh dynamics of fluids, and/or ground loads such as those that may be generated from adverse braking or maneuvering during taxiing. This force may move or shift the aircraft flooring structure that is formed by a combination of flooring panels 1, which may generate a force that is applied to the floor puck 15.

In some cases, when installed, the floor puck (15) may be located inside the panel housing 14. Further, the gap control media of the floor puck 15 damps any forces generated during a loading condition. Also, at a non-loading condition, the gap control media applies a force to return the floor puck 15 to an initial position (e.g., a centered position or the like).

The gap control media may consist of mechanical components such as springs, compressed arcs, and elastic components under tension or compressible materials such as foam or silicone. For example, the U.S. patent application Ser. No. 16/590,038 illustrates examples where the gap control media consists of, respectively, spring-loaded arcs operating under compression and/or elastic components operating under tension. Such gap control media are illustrative and other gap control media may be contemplated without departing from the scope of this disclosure.

Making reference to FIG. 4A, the panel housing 14 may be located on an edge of surface of the flooring panel 1, such as between the upper layer 5 and the structural floor 11 to locate a floor puck 15 between two contiguous flooring panels 1 and 1'. This configuration allows for simpler disassembly and/or reinstallation of each flooring panel 1 and 1' without removing more than one flooring panel 1 to access to the structural floor 11, such as when replacing a flooring panel 1 and/or when performing maintenance tasks.

In an illustrative example, the floor pucks 15 may be located close to an edge where the panels are joined to minimize any potential deflection at these joints and/or to generate less movement. Accordingly, when the floor pucks 15 are installed close to the joint, less deflection may be generated in the joint and thus reducing a risk of a mechanical failure in the joint.

The upper layer 5 may serve as the exposed floor surface of the aircraft flooring. Accordingly, it may be desirable that the upper layer 5 includes anti-slip patterns, anti-slip coatings, anti-scratching coatings or combinations thereof. In some cases, the upper layer 5 may include a real organic material or an engineered material with the appearance of a finishing surface, such as carpet, plastic tiles, ceramic tiles, and/or wood tiles. In some cases, the upper layer 5 may be applied separately during the flooring installation. In some cases, the upper layer 5 may be pre-assembled as part of the flooring panel 1 during a manufacturing process.

In some cases, the upper layer 5 of the flooring panel 1 may be made of a material selected from aramid fiber composites, carbon fiber composites, fiberglass composites, thermoplastic elastomers, EPDM, polyamides (PA) (e.g. PA12, PA6, PA66), polyetheretherketone (PEEK), thermosetting polyimides, polyamide-imide (PAI), polychlorotrifluoroethylene (PCTFE), polytetrafluoroethylene (PTFE), polymethylmethacrylate (PMMA), polyvinyl chloride (PVC), chlorinated polyvinyl chloride (CPVC), vinylidene polyfluoride (PVDF), ethylene-chlorotrifluoroethylene (ECTFE), cross-linked polyethylene (PEX) copolymers thereof, and combinations thereof.

For example, the upper layer 5 may be a fiber reinforced laminate, such as a laminate of aramid fibers bonded together with epoxy resin, carbon fibers bonded together with epoxy resin, or fiberglass fibers bonded together with polymeric resins (e.g. unsaturated polyester resins, saturated polyester resins, orthophtalic polyester resins, isophthalic polyester resins, vinyl ester resins, urethane-acrylic resins). Particularly, the fibers may be provided in mats (e.g. woven mats, stitch-bonded mats, agglutinant bonded mats) or as cut fibers.

The fiber reinforced laminates may be selected for aeronautic applications because they provide a high relation of resistance/weight in comparison with metal panels, solid polymer panels, and some honeycomb 13 composite materials that may not be as strong as a laminated material.

In some cases, the core ply 8 is the material that provides improved stiffness and support to the upper layer 5 because the core ply 8 may make the flooring panel 1 thicker without adding significant weight. Accordingly, a thicker flooring panel 1 has a greater moment of inertia, hence a greater stiffness.

Figure 2A:
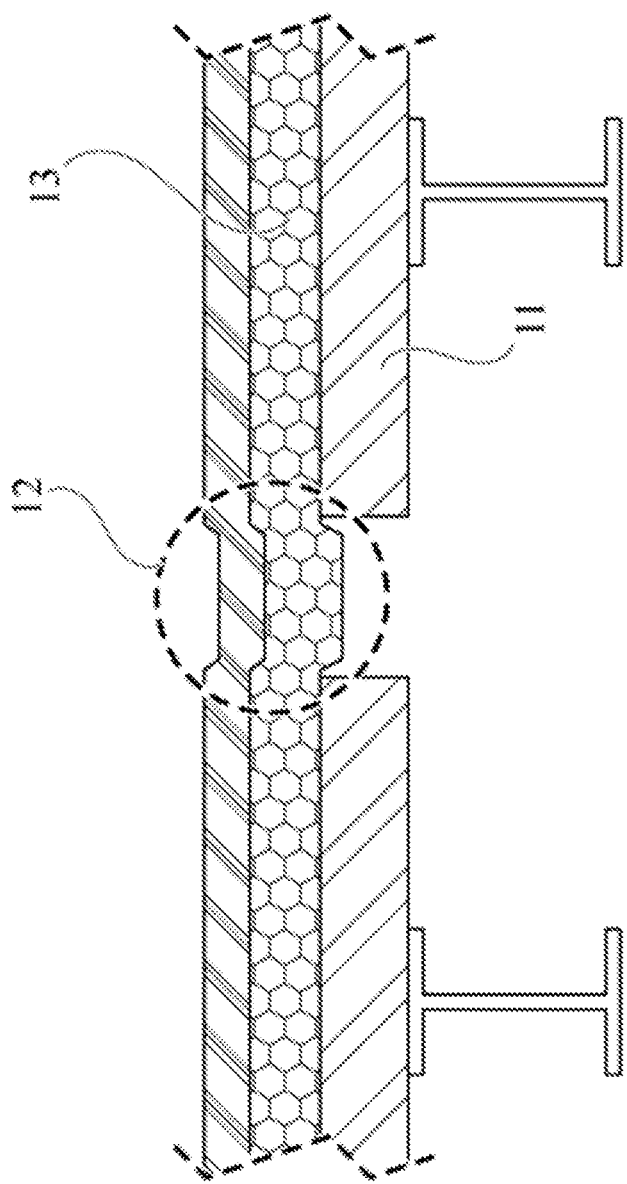
FIG. 2A corresponds to an illustrative section view of a flooring panel showing a telegraphing effect over an upper layer and a bottom layer.
Figure 2B:
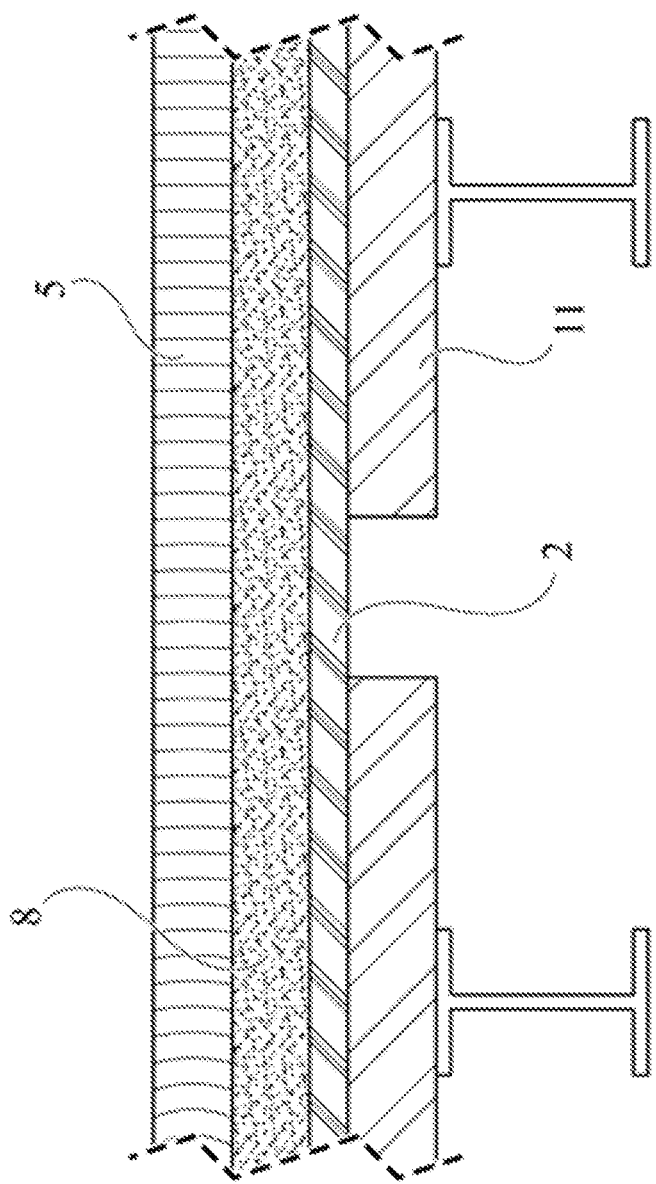
FIG. 2B corresponds to a section view of an illustrative example of a flooring panel that is not suffering the telegraphing effect according to aspects of this disclosure.

Making reference to FIG. 2A and FIG. 2B, the core ply 8 may provide the necessary stiffness to the upper layer 5 to provide a stable and stiff substrate, while the bottom layer 2 absorbs minor unevenness. In some cases, the bottom layer 2 may be made of a compressible elastomeric thermoplastic. Accordingly, the bottom layer 2 and the core ply 8 form a combination that will avoid a telegraphing 12 effect over the upper layer 5. Telegraphing 12 is an effect of a pronounced load on a surface that, over time, cause marks, subsidence, and/or imperfections on the surface.

For example, the FIG. 2A corresponds to a section view of a flooring panel of the prior art showing the telegraphing 12 effect over the upper layer and bottom layer 13. Under a high enough compressive load, the honeycomb 13 layer reaches critical stress and fails due to one or more of the following mechanisms: elastic buckling, plastic yielding, and/or brittle crushing, where elastic buckling of the cell walls is a mode of failure for elastomeric materials. On the other hand, ductile materials may fail due to plastic yielding, and brittle materials may fail due to brittle crushing.

As already noted, FIG. 2B corresponds to a section view of a flooring panel described in the present disclosure, which is not suffering the telegraphing 12 effect thanks to the multiple layers. For example, the core ply 8 and the bottom layer 2 supports the upper layer 5, avoiding any kind of marks on the top face 6 of the upper layer 5 due to the constant loads on the top face 6.

In some cases, the core ply 8 is made of a low weight material, for example, a material selected from a group comprising non-woven polyester textiles, non-woven polyester textiles including microbeads and perforations (e.g. Coremat®, VitelMat®), pressure stable polyester non-woven textiles having channels (e.g. Soric®), polyethylene foams, polyvinyl chloride (PVC) foams, polymethacrylimide foams, honeycomb core materials (e.g. aluminum, heat- and flame resistant textile, such as Nomex®), and combinations thereof.

For example, during the manufacturing process of the flooring panel 1, the bottom layer 2 and the upper layer 5 can be laminated with the core ply 8 by a lamination processes such as, for example, resin transfer molding (RTM), vacuum infusion processing, and autoclave processing. In these processes are recommended using as core plies 8 materials such as pressure stable polyester non-woven textiles having channels (e.g. Soric®), polyethylene foams, polyvinyl chloride (PVC) foams, and polymethacrylimide foams. Such materials allow an even flow of resins (e.g. polyester, vinyl ester, acrylic, epoxy) inside closed molds to distribute the resins along the core ply 8 to cover reinforcement materials, such as aramid, carbon or glass fibers.

The flooring panel 1 may include veils applied to the molds during the laminating process. Such veils may provide a smooth finish to the upper layer 5. Additionally, the upper layer 5 may include an anti-slip pattern, such as a grit pattern, squares pattern, dots pattern, or another high relief patterns or low relief patterns. In this case, a mold of the flooring panel 1 have a low relief pattern or high relief pattern to form the anti-slip pattern of the upper layer 5. Accordingly, use of the veils allow for an even coverage of the low relief pattern or high relief pattern in the mold, which is important to avoid having fragile edges in the anti-slip pattern of the upper layer 5 that may be produced by a high concentration of resin without reinforcement.

Similarly, during the manufacturing process of the flooring panel 1, the upper layer 5, the core ply 8, and the bottom layer 2 can be laminated together by processes such as RTM, vacuum infusion processing, and autoclave processing. For such processes, one or more core ply 8 materials may be used, such as pressure stable polyester non-woven textiles having channels (e.g. Soric®), polyethylene foams, polyvinyl chloride (PVC) foams, and polymethacrylimide foams. Such materials may allow an even flow of resins (e.g. polyester, epoxy) inside closed molds to distribute the resins along the core ply (8) to cover reinforcement materials, such as aramid, carbon and/or glass fibers.

In some cases, the bottom layer 2 may be made of an elastomeric-thermoplastic panel (e.g. Isodamp® panel). This type of bottom layer 2 may provide, for example, acoustical and/or vibration isolation.

For example, the flooring panels 1 may be made of a laminated sandwich of a bottom layer 2, an upper layer 5, and a core ply 8. The bottom layer 2 may be made of an elastomeric-thermoplastic panel, and the upper layer 5 may be made of wood. The core ply 8 may be, in some cases, made from a laminated sandwich material such as PVC foam cured between sheets of woven fiberglass fabric pre-impregnated in epoxy resin.

Accordingly, the upper layer 5 may be manufactured of one or more materials, such as bamboo, cork, hardwood, laminated wood, engineered wood, plywood, and combinations thereof.

Making reference to FIG. 4B and FIG. 5, the flooring panel 1 may be connected to one or more other flooring panels 1 to form a flooring section, where the flooring sections may be formed by a connected plurality of flooring panels 1.

Making reference to the U.S. patent application Ser. No. 16/774,641 entitled "Spacer Assembly for Aircraft Flooring", a spacer panel 16 may have a length that is long enough to cover a portion of an edge or that is long enough to cover an entire edge of the flooring section. Accordingly, a single spacer panel 16 may connect several flooring panels 1 and, therefore, may be used to interconnect contiguous flooring sections. An advantage of this configuration is that the spacer panel 16 may provide stiffness to the joint of the contiguous flooring sections because minimizing use of spacer panels 16 allows for a minimization of discontinuities in a contiguous flooring section. For example, use of a single spacer panel 16 to interconnect a plurality of flooring panels avoids use of multiple spacer panels 16 that would have been located between each contiguous flooring panels 1 and, as such, removes the possibility of the plurality of discontinuities that would have been present with use of multiple spacer panels 16. Additionally, a single spacer panel 16 may be easier to install and/or easier to remove in comparison with a plurality of spacer panels 16.

Further, use of a single spacer panel 16 may provide a rigid connection between the flooring sections to form a monolithic flooring assembly that may float and/or displace horizontally thanks, at least in part, to the operation of a plurality of floor pucks 15 (e.g. evenly distributed floor pucks 15), such as the floor pucks 15 described in the U.S. patent application no. U.S. Ser. No. 16/590,038.

As described in the U.S. patent application Ser. No. 16/774,641 entitled "Spacer Assembly for Aircraft Flooring", and referring to FIG. 4B, the flooring panels 1 and 1' may form a gap when they are connected to the spacer panel 16. If required, the gap may be filled with a sealant member 17, which may seal the gap and may prevent infiltrations of liquids spilled over the flooring panels 1 and 1', which could reach the structural floor 11 of the aircraft. Such infiltrations of liquid may cause damage to electric or electronic instruments and/or may increase corrosion risk to the aircraft. Additionally, the sealant member 17 may provide an elastic connection between the flooring panels 1 and 1', which may provide bending and/or shear resistance to the aircraft flooring.

In some cases, the sealant member 17 may be made from one or more materials such as, for example, grouts of polyvinyl chloride, extruded polyvinyl chloride, extruded polymers, thermoplastic resins, epoxy resins, silicone, elastomeric gaskets, and combinations thereof. Also, the sealant member 17 may be made of a material such as, for example, natural rubber, polyisoprene, polybutadiene, styrene-butadiene rubber, butyl rubber, or nitrile rubber.

For example, the sealant member 17 may be a grout, where the grout may be applied between the flooring panels 1 and 1'. The grout may be a polymeric material which may be applied between the flooring panels 1 and 1' when the flooring panels 11' are connected to the spacer panel 16. Use of a grout may allow for filling discontinuities, cracks, scratches and/or other surface defects of the flooring panels (and 1'. Accordingly, the grout may provide an effective seal to avoid infiltrations of liquids within or underneath the flooring panels 1 and 1', such as avoiding infiltrations of liquids in the interlayers of the flooring panels 1 and 1' when they are formed by laminated layers.

Referring to FIG. 1, the structural floor 11 may be supported by a plurality of structural beams of an enclosure, such as the fuselage of an aircraft. When the aircraft flooring is installed, the bottom layer 2 may be laid on the structural floor 11 with the bottom face 4 of the flooring panel 1 facing the structural floor 11. The core ply 8 may be located over the top face 3 of the bottom layer 2, and the upper layer may be located over the top face 9 of the core ply 8 to make a flooring panel 1. In some cases, the lamination of the bottom layer 2, core ply 8, and the top layer 5 could be pre-assembled during a manufacturing process of the flooring panel 1.

The flooring assembly, according to aspects of this disclosure, may be installed in one or more different places or vehicles, such as, for example, pressurized rooms, pressurized vessels, submarines, spaceships, helicopters, boats, ships, and other such places or vehicles that may be submitted to compression and de-compression, pressurization, and/or forces generated by high speeds and accelerations (e.g., G-forces).

EXAMPLES

Example 1

Making reference to FIG. 3, the flooring panel 1 includes an upper layer 5 made of PVC thermoplastic with the appearance of wood, a core layer 8 made from a laminated sandwich material of PVC foam cured between sheets of woven fiberglass fabric pre-impregnated in epoxy resin, and a bottom layer 2 made of an elastomeric-thermoplastic panel (e.g. an Isodamp® panel).

The flooring panel 1 may be attached to the structural floor 11 by a floor puck 15. The flooring panel 1 may be made of a laminated sandwich of a bottom layer 2, and an upper layer 5 and a core ply 8.

Making reference to FIGS. 4A and 4B, each flooring panel 1 may have a panel housing 14, and each panel housing 14 may be located in an edge under the upper layer 5, wherein the cavities are collinear between them.

Example 2

The flooring panels 1 may be connected to the structural floor 11 by a floor puck 15. The flooring panels 1 may be made of a laminated sandwich of a bottom layer 2, an upper layer 5, and a core ply 8. The core ply 8 may be made of a laminated sandwich material of aramids reinforced honeycomb core cured between sheets of woven fiberglass fabric pre-impregnated in epoxy resin. The bottom layer 2 may be made of an elastomeric-thermoplastic panel (e.g., an Isodamp® panel). The upper layer 5 may be made of a composite of epoxy resin reinforced with a mat of carbon fibers.

Example 3

A flooring panel 1 may include an upper layer 5 made of wood, a core layer 8 made of a laminated sandwich material of aramids reinforced honeycomb core cured between sheets of woven carbon fiber fabric pre-impregnated in epoxy resin, and a bottom layer 2 made of an elastomeric-thermoplastic panel (e.g., an Isodamp® panel).

The flooring panel 1 may be connected to a second flooring panel 1' with a spacer panel 16 and a grout seal 17. The spacer panel 16 may be a spacer panel like the one described in the U.S. patent application Ser. No. 16/774,641, entitled "Spacer Assembly for Aircraft Flooring".

Example 4

A flooring panel 1 may include the described panels 1 of Example 3, with the difference that the core ply 8 may be made of PET foam.

Example 5

A flooring panel 1 of FIG. 1, where the bottom layer 2 may be made of an elastomeric-thermoplastic panel (e.g., an Isodamp® panel), the upper layer 5 may be made of wood, and the core ply 8 may be made of a laminated sandwich material of PVC foam cured between sheets of woven fiberglass fabric pre-impregnated in epoxy resin. Accordingly, those elements may follow an assembly sequence of:

a) removing a backing from an adhesive material located in the flooring panel 1;

b) aligning the flooring panel 1 with an edge of the spacer panel 16;

c) pressing down the flooring panel 1 against the spacer panel 16 to fix the panels together;

d) removing a backing from an adhesive tape located on a floor puck 15, where the floor puck 15 is attached to the flooring panel 1;

e) aligning the edges of the flooring panel 1 with two reference directions; and f) pressing down the flooring panel 1 against the structural floor 11.

It should be understood that the present invention is not limited to the examples described and illustrated, as it will be evident to a person skilled in the art that there are variations and possible modifications that do not depart from the spirit or scope of the present disclosure.

The invention claimed is:

1. A flooring panel placed atop structural flooring, comprising:
a bottom layer having a top face and a bottom face;
an upper layer having an upper face and a lower face; and
a core ply having an upper surface and a bottom surface,
wherein the upper surface is bonded to the lower face of the upper layer and the bottom surface is bonded to the top face of the bottom layer, and
wherein the flooring panel is connected to a second flooring panel by a floor puck, wherein the bottom face of the bottom layer is located on a structural floor of an aircraft, and wherein the flooring panel slides over the structural floor.

2. The flooring panel of claim 1, wherein the flooring panel is connected to a third flooring panel by a spacer panel.

3. The flooring panel of claim 1, wherein the flooring panel comprises a panel housing located on the bottom face of the upper layer, wherein the panel housing is operatively designed to connect the floor puck.

4. The flooring panel of claim 1, wherein the core ply and the bottom layer are both under the upper layer and wherein a combination of the core ply and the bottom layer prevents telegraphing of the upper layer.

5. The flooring panel of claim 1, wherein the floor puck is located under the upper layer of each of the flooring panel and the second flooring panel and wherein the floor puck is adjacent to the core ply and the bottom layer of each of the flooring panel and the second flooring panel.

6. The flooring panel of claim 1, wherein the upper layer comprises a natural material.

7. The flooring panel of claim 1, wherein the bottom face comprises a plastic.

8. The flooring panel of claim 1, wherein the core ply comprises a foam.

9. The flooring panel of claim 1, wherein the core ply comprises a laminated sandwich material.

10. A flooring panel placed atop structural flooring, comprising:
a bottom layer having a top face and a bottom face;
an upper layer having an upper face and a lower face; and
a core ply having an upper surface and a bottom surface,
wherein the upper surface is bonded to the lower face of the upper layer and the bottom surface is bonded to the top face of the bottom layer, and wherein the flooring panel is connected to a second flooring panel by a floor puck, wherein the floor puck is located under the upper layer of each of the flooring panel and the second flooring panel, wherein the floor puck is adjacent to the core ply and the bottom layer of each of the flooring panel and the second flooring panel, and wherein the bottom face of the bottom layer is located on a structural floor of an aircraft and wherein the flooring panel slides over the structural floor.

11. The flooring panel of claim 10, wherein the flooring panel is connected to a third flooring panel by a spacer panel.

12. The flooring panel of claim 10, wherein the flooring panel comprises a panel housing located on the bottom face of the upper layer, wherein the panel housing is operatively designed to connect the floor puck.

13. The flooring panel of claim 10, wherein the core ply and the bottom layer of the flooring panel are both under the upper layer and wherein a combination of the core ply and the bottom layer prevents telegraphing of the upper layer of the flooring panel.

14. The flooring panel of claim 10, wherein the upper layer of the flooring panel comprises a natural material.

15. The flooring panel of claim 10, wherein the bottom face of the flooring panel comprises a plastic.

16. The flooring panel of claim 10, wherein the core ply of the flooring panel comprises a foam.

17. The flooring panel of claim 10, wherein the core ply of the flooring panel comprises a laminated sandwich material.

18. A flooring panel placed atop structural flooring, comprising:

a bottom layer having a top face and a bottom face;

an upper layer having an upper face and a lower face, wherein the upper layer comprises a natural material; and a core ply having an upper surface and a bottom surface, wherein the upper surface is bonded to the lower face of the upper layer and the bottom surface is bonded to the top face of the bottom layer, and wherein the flooring panel is connected to a second flooring panel by a floor puck, wherein the flooring panel comprises a panel housing located on the bottom face of the upper layer, wherein the panel housing is operatively designed to connect the floor puck, wherein the bottom face of the bottom layer is located on a structural floor of an aircraft, and wherein the flooring panel slides over the structural floor.

19. The flooring panel of claim 18, wherein the flooring panel is connected to a third flooring panel by a spacer panel.

20. The flooring panel of claim 18, wherein the bottom face comprises a plastic.

* * * * *